United States Patent
Byoun et al.

(10) Patent No.: US 9,620,160 B1
(45) Date of Patent: Apr. 11, 2017

(54) DATA STORAGE DEVICE MEASURING RESONANT FREQUENCY OF A SHOCK SENSOR BY INSERTING THE SHOCK SENSOR INTO AN OSCILLATOR CIRCUIT

(71) Applicant: Western Digital Technologies, Inc., Irvine, CA (US)

(72) Inventors: Jaesoo Byoun, Irvine, CA (US); Timothy A. Ferris, Mission Viejo, CA (US)

( * ) Notice: Subject to any disclaimer, the term of this patent is extended or adjusted under 35 U.S.C. 154(b) by 0 days.

(21) Appl. No.: 14/981,844

(22) Filed: Dec. 28, 2015

(51) Int. Cl.
  *G11B 5/596* (2006.01)
  *G11B 5/09* (2006.01)

(52) U.S. Cl.
  CPC ............ *G11B 5/59694* (2013.01); *G11B 5/09* (2013.01)

(58) Field of Classification Search
  None
  See application file for complete search history.

(56) References Cited

U.S. PATENT DOCUMENTS

| | | | |
|---|---|---|---|
| 4,358,742 A | 11/1982 | Ferris | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,226,140 B1 * | 5/2001 | Serrano ............ | G11B 5/59694 360/31 |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |

(Continued)

*Primary Examiner* — K. Wong

(57) ABSTRACT

A data storage device is disclosed comprising a disk, a head, a shock sensor, and an oscillator circuit responsive to the shock sensor and configured to generate an oscillating signal using positive feedback. A resonant frequency of the shock sensor is detected based on the oscillating signal. A physical shock affecting the head actuated over the disk is detected based on a response of the shock sensor to the physical shock and based on the detected resonant frequency of the shock sensor.

19 Claims, 5 Drawing Sheets

(56) References Cited

U.S. PATENT DOCUMENTS

| | | |
|---|---|---|
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |

(56) References Cited

U.S. PATENT DOCUMENTS

| | | |
|---|---|---|
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,953 B1 * | 9/2009 | Cerda ............... G11B 5/5582 360/77.04 |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,132,459 B2 * | 3/2012 | Toga ............... G01P 21/00 73/514.34 |
| 8,145,934 B1 | 3/2012 | Ferris et al. |
| 8,179,626 B1 | 5/2012 | Ryan et al. |
| 8,184,389 B2 | 5/2012 | Finamore et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,515,135 B2 | 8/2013 | Clarke et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

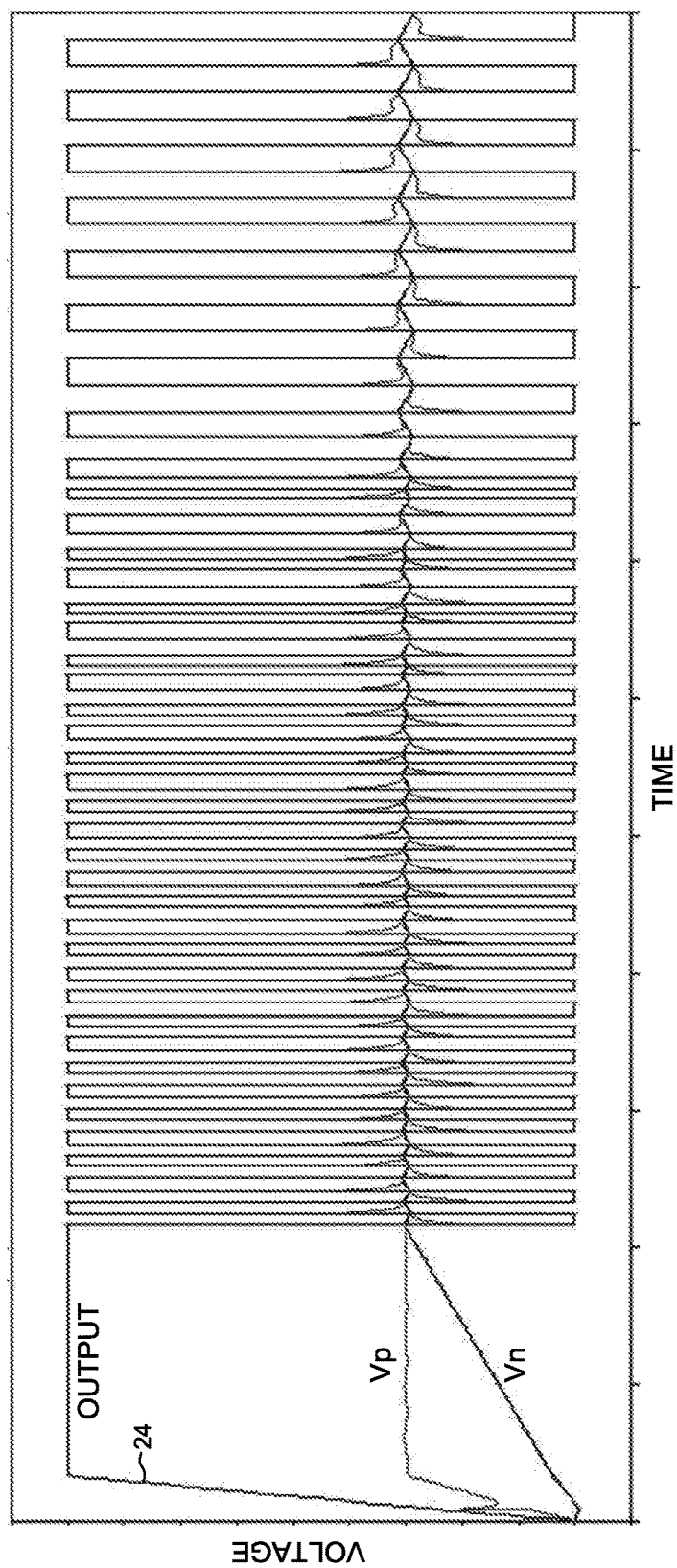

DATA STORAGE DEVICE MEASURING RESONANT FREQUENCY OF A SHOCK SENSOR BY INSERTING THE SHOCK SENSOR INTO AN OSCILLATOR CIRCUIT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 5 shows example waveforms generated by the oscillator circuit of FIG. 4B, including an oscillating signal representing the resonant frequency of the shock sensor.

DETAILED DESCRIPTION

Figure 2:
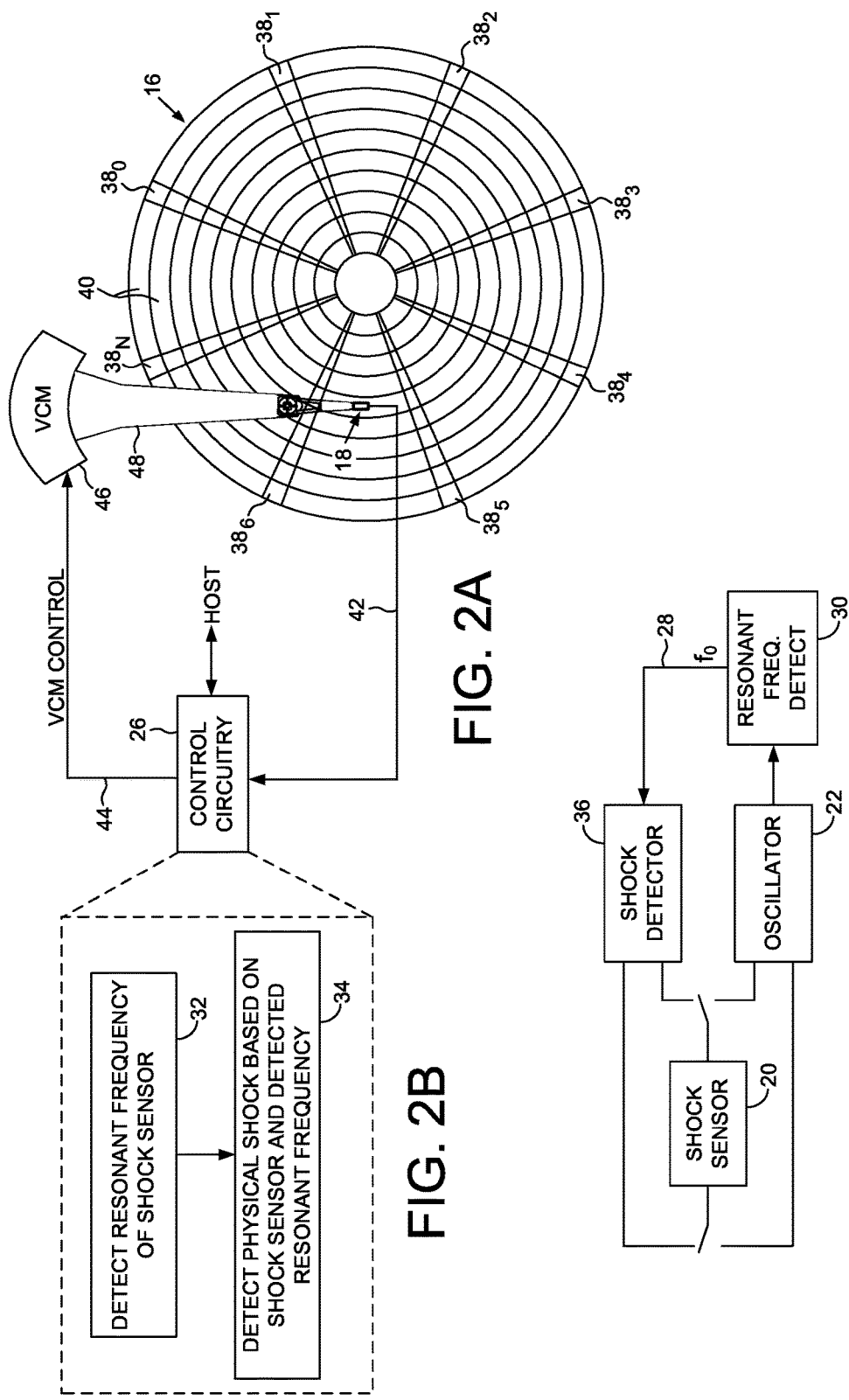
FIG. 2A shows a data storage device in the form of a disk drive according to an embodiment comprising a head actuated over a disk.
FIG. 2B is a flow diagram according to an embodiment wherein a resonant frequency of a shock sensor is detected using an oscillator circuit.
FIG. 2C shows an embodiment wherein the shock sensor is connected to an oscillator circuit when detecting the resonant frequency, and connected to a shock detector when detecting physical shocks affecting the head actuated over the disk.

FIGS. 2A-2C show a data storage device in the form of a disk drive according to an embodiment comprising a disk 16, a head 18, a shock sensor 20, and an oscillator circuit 22 responsive to the shock sensor 20 and configured to generate an oscillating signal 24 using positive feedback. The disk drive further comprises control circuitry 26 configured to execute the flow diagram of FIG. 2B, wherein a resonant frequency 28 of the shock sensor is detected 30 based on the oscillating signal (block 32). A physical shock affecting the head actuated over the disk is detected 36 based on a response of the shock sensor to the physical shock and based on the detected resonant frequency of the shock sensor (block 34).

Figure 1:
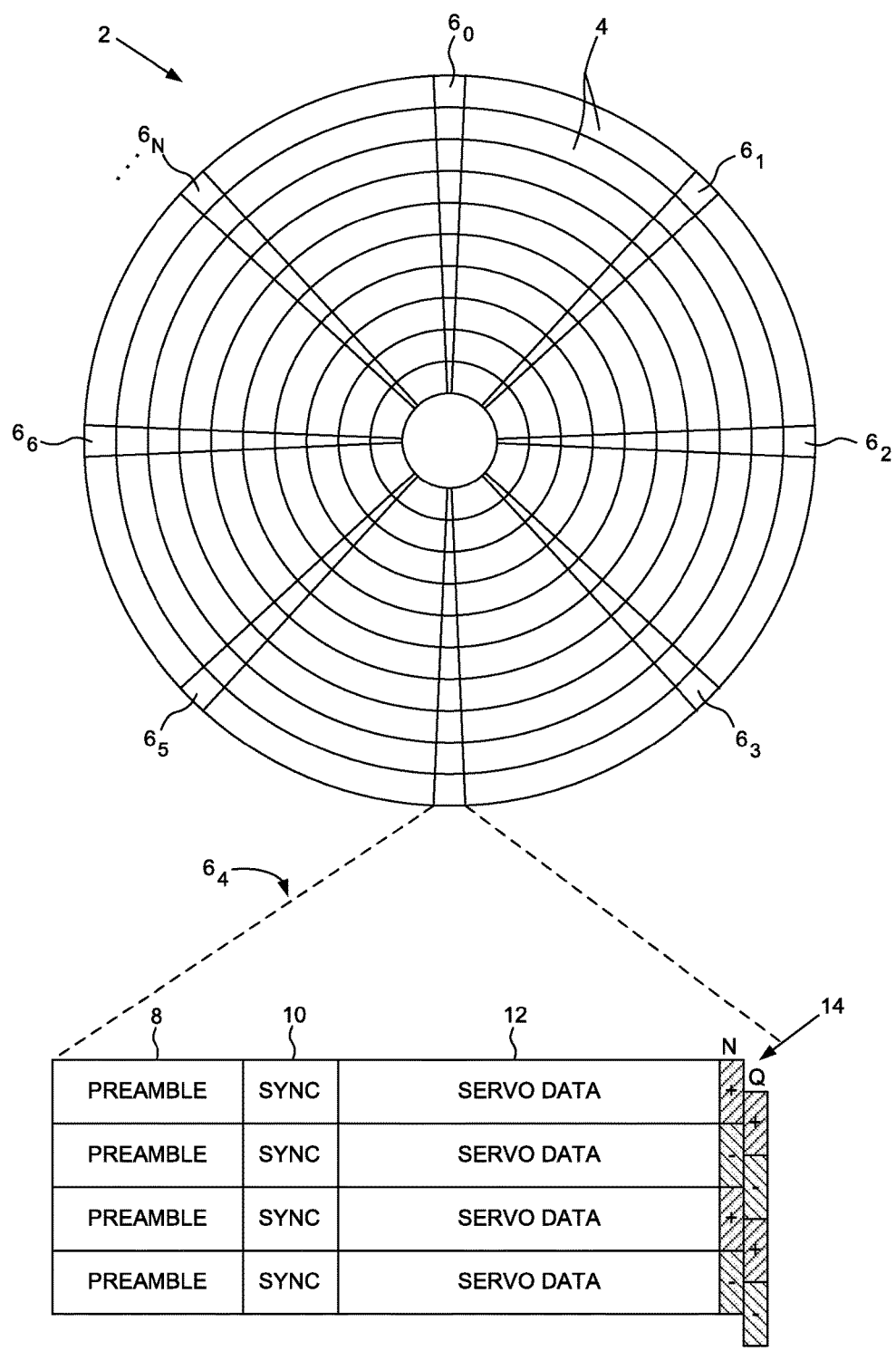
FIG. 1 shows a prior art disk format comprising a plurality of servo tracks defined by servo sectors.

In the embodiment of FIG. 2A, the disk 16 comprises a plurality of servo sectors $38_0$-$38_N$ that define a plurality of servo tracks 40, wherein data tracks are defined relative to the servo tracks at the same or different radial density. The control circuitry 26 processes a read signal 42 emanating from the head 18 to demodulate the servo sectors $38_0$-$38_N$ and generate a position error signal (PES) representing an error between the actual position of the head and a target position relative to a target track. A servo control system in the control circuitry 26 filters the PES using a suitable compensation filter to generate a control signal 44 applied to a voice coil motor (VCM) 46 which rotates an actuator arm 48 about a pivot in order to actuate the head 18 radially over the disk 16 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

It may be desirable to detect a physical shock affecting the head 18 as it is actuated over the disk 16, for example, in order to abort a write operation or to compensate for the physical shock by adjusting the control signal 44 applied to the VCM 46 (e.g., using feed-forward compensation). Any suitable shock sensor 20 may be employed in the embodiments, such as a suitable piezoelectric sensor. In one embodiment, the shock sensor 20 may exhibit a resonant frequency that effectively distorts the response of the shock sensor 20 to a physical shock. It may therefore be desirable to compensate for the resonant frequency in the shock sensor's output signal, for example, by attenuating the response of the sensor 20 at the resonant frequency (e.g., using a notch filter). Accordingly, in one embodiment the resonant frequency of the shock sensor 20 is detected, and then a physical shock to the disk drive is detected (by a shock detector 36) based on the response of the shock sensor 20 to the physical shock and based on the detected resonant frequency of the shock sensor 20.

Figure 3:
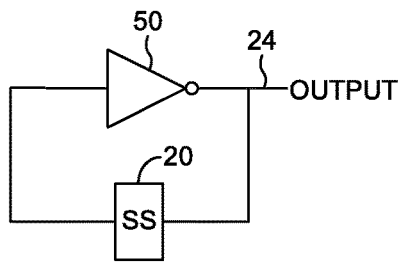
FIG. 3 shows an embodiment wherein the oscillator circuit comprises a single ended inverting amplifier.

Any suitable oscillator circuit 22 may be employed in the embodiments (e.g., FIG. 2C), including any suitable configuration of active elements (transistors, amplifiers, etc.) and/or passive elements (resistors, capacitors, inductors, etc.) that form an oscillator circuit 22. FIG. 3 shows an embodiment wherein the oscillator circuit 22 comprises a single ended inverting amplifier 50. The output 24 of the inverting amplifier 50 is fed back to the input through the shock sensor 20. In one embodiment, the phase response of the shock sensor 20 is 180 degrees, thereby providing a positive feedback loop from the output to the input of the inverting amplifier 50. In addition, the gain of the inverting amplifier 50 multiplied by the gain of the gain of the shock sensor 20 (i.e., the loop gain) is greater or equal to one (the Barkhausen criteria) to ensure the output 24 of the inverting amplifier 50 oscillates at the resonant frequency of the shock sensor 20.

Figure 4A:
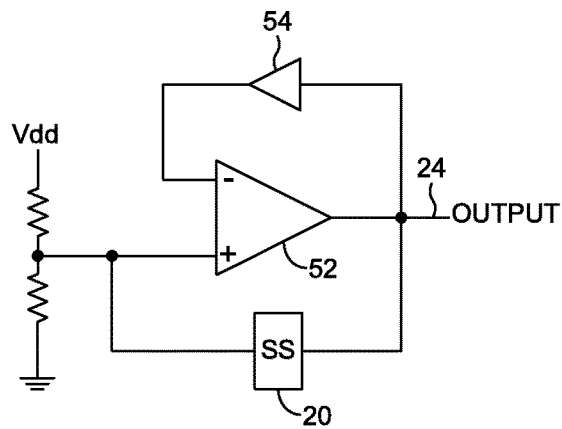
FIG. 4A shows an embodiment wherein the oscillator circuit comprises a differential inverting amplifier including a negative-path amplifier.
Figure 4B:
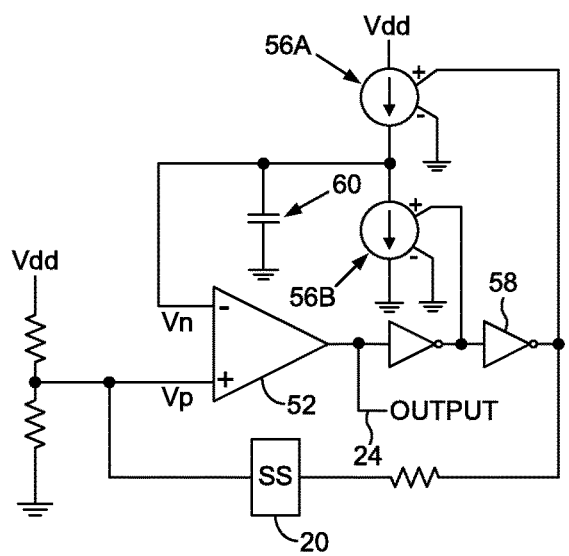
FIG. 4B shows an embodiment wherein the negative-path amplifier is implemented using switching current sources.

In one embodiment, the shock sensor 20 may have a relatively low Q factor requiring an oscillator circuit 22 with a higher gain in order to ensure the circuit oscillates. FIG. 4A shows an embodiment wherein the oscillator circuit 22 comprises a differential amplifier 52 comprising an output 24 coupled to a first terminal of the shock sensor 20, and a positive input coupled to a second terminal of the shock sensor 20, thereby providing the positive feedback to generate the oscillating signal 24. Also in the embodiment of FIG. 4A, the output 24 of the differential amplifier 52 is further coupled to a negative input of the differential amplifier 52 through a negative-path amplifier circuit 54. In one embodiment, the negative-path amplifier circuit 54 increases the loop gain of the oscillator circuit to ensure the circuit oscillates. FIG. 4B shows an embodiment wherein the negative-path amplifier circuit 54 comprises a first current source 56A comprising an input coupled to the first terminal of the shock sensor 20, a second current source 56B comprising an input coupled to the first terminal of the shock sensor through an inverter 58, and a capacitor 60 coupled to the first current source 56A and the second current source 56B. The first current source 56A amplifies the loop gain when the output 24 is positive, and the second current source 56B amplifies the loop gain when the output 24 is negative.

FIG. 5 shows example waveforms generated by the oscillator circuit 22 of FIG. 4B, including an oscillating signal 24 representing the resonant frequency of the shock sensor 20. FIG. 5 illustrates that in one embodiment the oscillator circuit 22 may exhibit a settle time before the oscillating signal 24 stabilizes to the resonant frequency of the shock sensor 20. Accordingly, in one embodiment after coupling the shock sensor 20 to the oscillator circuit 22 and enabling the oscillator circuit 22, the control circuitry may wait for a predetermined interval before evaluating the oscillating signal 24 to detect the resonant frequency 28 of the shock sensor 20.

Figure 6:
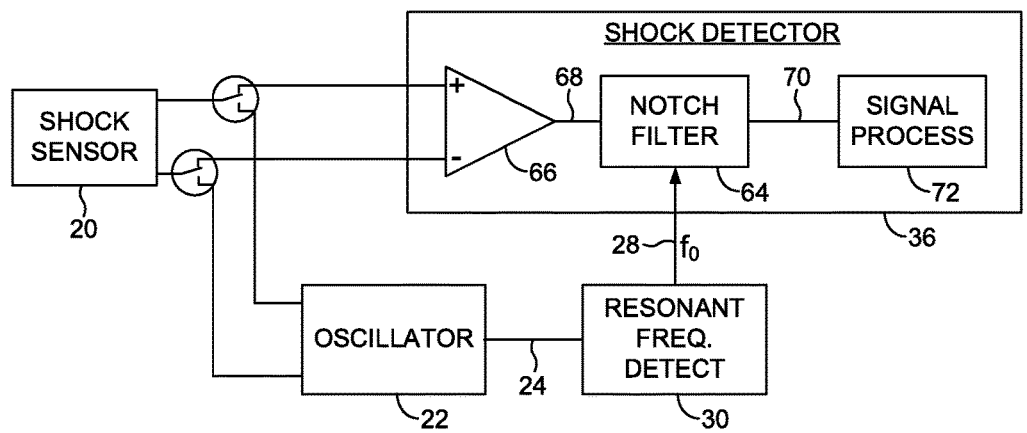
FIG. 6 shows an embodiment wherein the detected resonant frequency of the shock sensor is used to configure a notch filter in the shock detector.

The detected resonant frequency 28 of the shock sensor 20 may be used to configure the shock detector 36 in any suitable manner. FIG. 6 shows an embodiment of a shock detector 36 wherein the resonant frequency 28 detected at block 30 is used to configure the center frequency of a notch filter 64. When the shock sensor 20 is coupled to the shock detector 36, a differential amplifier 66 amplifies the output of the shock sensor 20 to generate an amplified signal 68. The notch filter 64 attenuates the amplified signal 68 at the detected resonant frequency 28 of the shock sensor 20 to generate a compensated signal 70. The compensated signal 70 is further processed at block 72, for example, to evaluate the amplitude, frequency, and/or phase response of the shock sensor 20 to a physical shock affecting the disk drive.

Figure 7:
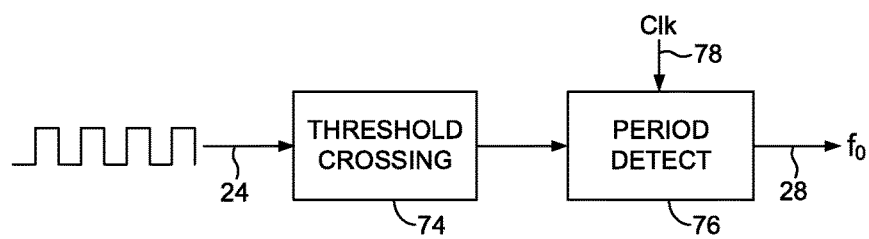
FIG. 7 shows an embodiment wherein the frequency of the oscillating signal is detected based on a period between threshold crossings of the oscillating signal.
Figure 8:
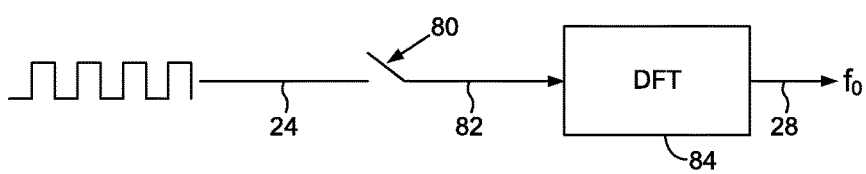
FIG. 8 shows an embodiment wherein the frequency of the oscillating signal is detected by sampling the oscillating signal and computing a discrete Fourier transform.

Any suitable technique may be employed to detect the resonant frequency 28 of the shock sensor 24 based on the oscillating signal 24 generated by the oscillator circuit 22. FIG. 7 shows an embodiment wherein the oscillating signal 24 is processed by a threshold crossing detector 74. A period detect circuit 76 measures a period between the threshold crossings (relative to a clock 78) in order to measure the period of the oscillating signal 24 (the resonant frequency 28 being the inverse of the period of the oscillating signal 24). In another embodiment shown in FIG. 8, the oscillating signal 24 may be sampled 80 and the resulting signal samples 82 processed at block 84 to compute a discrete Fourier transform of the oscillating signal 24 (or other suitable digital signal processing). In yet other embodiments, the oscillating signal 24 may be processed (in continuous or discrete time) using a suitable detection filter (e.g., notch or bandpass) having an adjustable center frequency. The center frequency of the detection filter may be adjusted until it matches the frequency of the oscillating signal 24 (as indicated by the output of the detection filter).

In one embodiment, the resonant frequency of the shock sensor 20 may vary over time due, for example, to general degradation of the shock sensor and/or due to a change in an environmental condition, such as a change in temperature or pressure. Accordingly, in one embodiment the shock sensor 20 may be reconnected to the oscillator circuit 22 in order to update the detected resonant frequency 28 of the shock sensor 20, as well as update operation of the shock detector 36. In yet another embodiment, the shock sensor 20 may be connected to both the oscillator circuit 22 and the shock detector 36 such that the detected resonant frequency 28 may be updated continuously over time.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head;
    a shock sensor;
    an oscillator circuit responsive to the shock sensor and configured to generate an oscillating signal using positive feedback; and
    control circuitry configured to:
        detect a resonant frequency of the shock sensor based on the oscillating signal; and
        detect a physical shock affecting the head actuated over the disk based on a response of the shock sensor to the physical shock and based on the detected resonant frequency of the shock sensor.

2. The data storage device as recited in claim 1, wherein the shock sensor is a piezoelectric sensor.

3. The data storage device as recited in claim 1, wherein the oscillator circuit comprises a differential amplifier comprising:
    an output coupled to a first terminal of the shock sensor; and
    a positive input coupled to a second terminal of the shock sensor, thereby providing the positive feedback to generate the oscillating signal.

4. The data storage device as recited in claim 3, wherein the output of the differential amplifier is further coupled to a negative input of the differential amplifier.

5. The data storage device as recited in claim 4, wherein the output of the differential amplifier is coupled to the negative input of the differential amplifier through a negative-path amplifier circuit.

6. The data storage device as recited in claim 5, wherein the negative-path amplifier circuit comprises:
    a first current source comprising an input coupled to the first terminal of the shock sensor; and
    a capacitor coupled to the first current source.

7. The data storage device as recited in claim 6, wherein the negative-path amplifier circuit further comprises a second current source comprising an input coupled to the first terminal of the shock sensor through an inverter.

8. The data storage device as recited in claim 1, wherein the control circuitry is further configured to:
    configure a notch filter based on the detected resonant frequency of the shock sensor, wherein the notch filter is configured to filter the response of the shock sensor; and
    detect the physical shock affecting the data storage device based on an output of the notch filter.

9. Control circuitry for use in a data storage device comprising a head actuated over a disk, the control circuitry comprising:
    an oscillator circuit connectable to a shock sensor, wherein the oscillator circuit is operable to generate an oscillating signal representing a resonant frequency of the shock sensor; and
    a shock detector configured to detect a physical shock affecting the head actuated over the disk based on a response of the shock sensor to the physical shock and based on the resonant frequency of the shock sensor.

10. The control circuitry as recited in claim 9, wherein the shock sensor is a piezoelectric sensor.

11. The control circuitry as recited in claim 9, wherein the oscillator circuit comprises a differential amplifier comprising:
    an output coupled to a first terminal of the shock sensor; and
    a positive input coupled to a second terminal of the shock sensor, thereby providing positive feedback to generate the oscillating signal.

12. The control circuitry as recited in claim 11, wherein the output of the differential amplifier is further coupled to a negative input of the differential amplifier.

13. The control circuitry as recited in claim 12, wherein the output of the differential amplifier is coupled to the negative input of the differential amplifier through a negative-path amplifier circuit.

14. The control circuitry as recited in claim 13, wherein the negative-path amplifier circuit comprises:
    a first current source comprising an input coupled to the first terminal of the shock sensor; and
    a capacitor coupled to an output of the first current source.

15. The control circuitry as recited in claim 14, wherein the negative-path amplifier circuit further comprises a second current source comprising an input coupled to the first terminal of the shock sensor through an inverter.

16. A method of operating a data storage device, the method comprising:
    detecting a resonant frequency of a shock sensor based on an oscillating signal generated by an oscillator circuit responsive to the shock sensor; and
    detecting a physical shock affecting a head actuated over a disk based on a response of the shock sensor to the physical shock and based on the detected resonant frequency of the shock sensor.

17. The method as recited in claim 16, wherein the shock sensor is a piezoelectric sensor.

18. The method as recited in claim 16, further comprising:
    connecting the shock sensor to the oscillator circuit when detecting the resonant frequency; and
    disconnecting the shock sensor from the oscillator circuit when detecting the physical shock affecting the head actuated over the disk.

19. The method as recited in claim 16, further comprising:
configuring a notch filter based on the detected resonant frequency of the shock sensor, wherein the notch filter is configured to filter the response of the shock sensor; and
detecting the physical shock affecting the data storage device based on an output of the notch filter.

\* \* \* \* \*